April 28, 1925.
E. BUCKINGHAM
THREAD GAUGE
Filed April 23, 1923
1,535,098
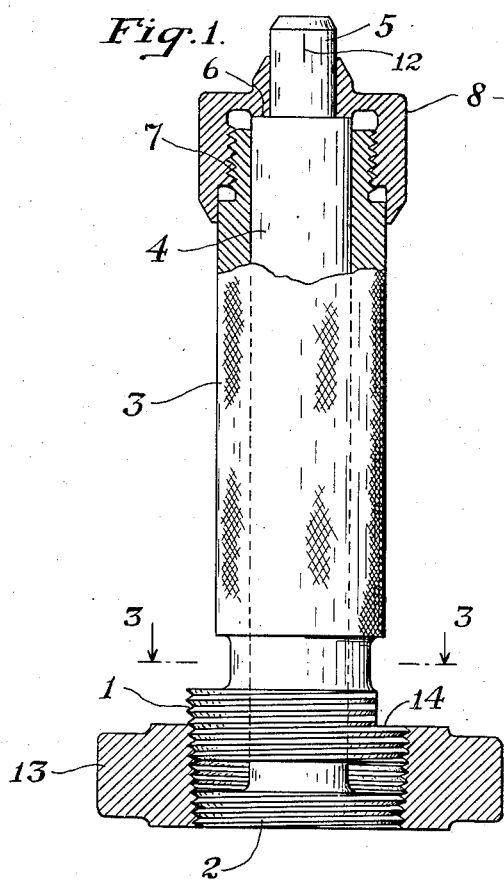
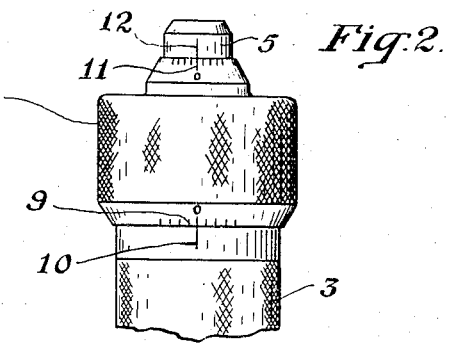
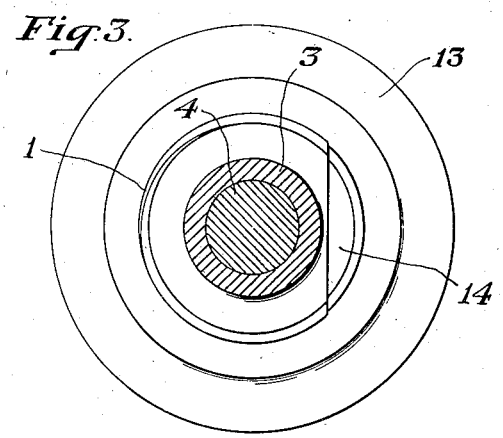
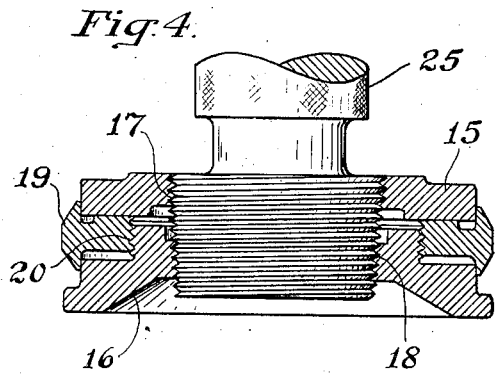
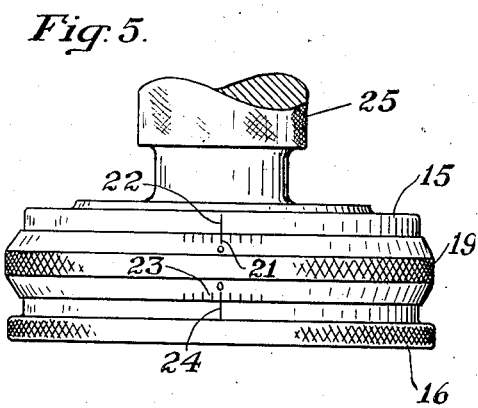
INVENTOR
Earle Buckingham
BY
ATTORNEY Patented Apr. 28, 1925.

1,535,098

UNITED STATES PATENT OFFICE.

EARLE BUCKINGHAM, OF HARTFORD, CONNECTICUT, ASSIGNOR TO PRATT & WHITNEY COMPANY, OF NEW YORK, N. Y., A CORPORATION OF NEW JERSEY.

THREAD GAUGE.

Application filed April 23, 1923. Serial No. 634,186.

*To all whom it may concern:*

Be it known that I, EARLE BUCKINGHAM, a citizen of the United States, residing at Hartford, in the county of Hartford and State of Connecticut, have invented certain new and useful Improvements in Thread Gauges, of which the following is a specification.

This invention relates to gauges and particularly to a combination thread gauge. The primary object of the invention is to provide a combination thread gauge particularly adapted to determine the correctness of the taper of threaded conical surfaces and the accuracy of the lead of the thread therein. More particularly, the invention relates to a thread gauge for measuring the accuracy of Briggs standard pipe threads commonly used for pipes and pipe fittings.

It is an object of the invention to provide an improved thread gauge particularly adapted to determine the accuracy of the lead of screw threads.

Another object of the invention is to provide gauges of the above types adapted to perform the measuring functions stated either on external or internal threaded surfaces.

With the above and other objects in view, my invention consists in the features of construction and operation set forth in the following specification and illustrated in the accompanying drawing. In such drawing annexed hereto and forming a part of this specification, I have shown my invention embodied respectively in taper thread gauges for internal and external threaded surfaces but it will be understood that the invention can be otherwise embodied and that the drawing is not to be construed as defining or limiting the scope of the invention, the claims appended to this specification being relied upon for that purpose.

Referring to the figures of the drawing:

Figure 1 is a side elevation partially in section of one form of my improved thread gauge illustrated as being in gaging contact with the conical threaded bore of a master ring gauge, the said ring gauge being shown in section.

Fig. 2 is a fragmentary side elevation of the gauge.

Fig. 3 is a cross section thereof taken on line 3—3 of Fig. 1.

Fig. 4 is a longitudinal sectional view of a modified form of my invention adapted to measure internal threaded surfaces, such gauge being illustrated as mounted on a master plug gauge.

Fig. 5 is a side elevation thereof.

As illustrated in the drawing, my invention comprises two relatively spaced and relatively movable gaging members each provided with means, as the screw threads illustrated, for engaging the threads of the surface to be measured or gauged. As illustrated in the drawing, these gaging members are coaxial and each is adapted to engage a portion of the screw threaded surface being gaged. Means including graduations are provided on the members for indicating the conical or taper accuracy of the surface and the accuracy of the lead of the thread therein, such means functioning by the axial relative spacing of and the relative angular position of the said two members. While in the drawing I have illustrated my invention in connection with a combination taper and lead measuring thread gauge, it should be understood that the invention is capable of various other embodiments not limited to the details illustrated. The invention illustrated will now be specifically described.

The gauge shown in Figs. 1, 2 and 3 for testing internal threaded surfaces or bores will first be described. This gauge comprises a pair of gaging members 1 and 2 each having two or three convolutions of accurately formed standard screw threads of the size and type of those in the threaded bore to be gaged. Integral with the gaging member 1 is an axially extending sleeve 3 knurled on its exterior surface to provide a hand grip. The member 2 is of disk-like form and has integral therewith a shank 4 adapted to extend axially through the sleeve 3. The non-gaging end of the shank is reduced at 5 in a manner to provide a shoulder 6.

Screw threaded to the end 7 of the sleeve is a cap 8 fitting over the reduced shank end 5 and engaging the shoulder 6. The threads 7 are of exactly the same pitch as the threads 1. The cap 8 is provided with graduations 9 thereon adapted to cooperate with a graduated mark 10 on the sleeve and with graduations 11 adapted to cooperate with a graduation mark 12 on the reduced shank end 5.

It will be obvious that in making and threading the work contacting surfaces 1 and 2 of the gaging members, they must be accurately made to conform not only to the particular taper of standard screw thread corresponding to the particular bore to be gaged but also must correspond to the particular form and lead of the screw threads. This may conveniently be done by securing the two gauge members 1 and 2 together in the proper relative position and finishing the screw threads thereon to a master gauge as if the gaging members 1 and 2 were one solid member. With the gaging members in the position just defined, the cap 8 is screw threaded onto the sleeve until the same rests firmly on the shoulder 6 of the shank 4. With the several parts of the gauge in this correct relationship, the graduations 9 and 11 and the cooperating indicia marks 10 and 12 are formed, the mark 10 being made to exactly register with the zero on the graduations 9 and the mark 12 being made to exactly register with the zero on the graduations 11.

In operation, the member 2 is first threaded into the conical bore to be gaged. The member 1 is thereafter threaded into the bore as far as it will readily go. If the taper of the bore is correct, the members 1 and 2 should be relatively spaced the same distance apart as when originally formed and threaded to the master gauge as above defined. The accuracy of the taper may be observed by the graduations 9 and 10. If the taper is correct the indicia line 10 will register exactly with the zero on the graduations 9. If, however, the taper is not correct the gaging member 1 will be in contact with the bore slightly closer to or further from the other gaging member 2. This will necessitate a threading of the sleeve 3 further into or out of the cap 8 to contact the cap with the shoulder 6 and the line 10 will not thereafter register with the said zero. In Figs. 1 and 2, the gauge is shown in gaging contact with the threaded bore of a master ring gauge 13. The threaded bore of this ring gauge is of correct taper and therefore the line 10 registers exactly with the zero on graduations 9.

In the lead of the thread is correct, the zero on the graduations 11 will register with the indicia line 12 in the same manner as when the gauge was formed and threaded to the master gauge as above defined. Should the lead of the thread be greater or less than the standard, however, the members 1 and 2 will be in a different relative angular position from that shown in Fig. 1 and the said zero will be to one side or the other of the mark 12, the members 1 and 2 of course being in the same axial position as that shown in Fig. 1, if the taper is correct. In Figs. 1 and 2, the lead of the threads in the ring gauge 13 is correct and the zero of graduations 11 is therefore in exact registry with the indicia line 12.

It should be understood that the taper and lead measurements are quite independent of each other. Any inaccuracy of taper causes the members 1 and 2 to be spaced axially nearer to or further from each other than the standard or accurate position shown in Fig. 1. Such a change causes the shoulder 6 to be spaced a different distance away from the end of the sleeve 3. This change, of course, requires a rotary adjustment of the cap 8 in one direction or the other on the sleeve which adjustment indicates by the graduations 9 the amount of plus or minus taper inaccuracy. It will be noted, however, that such inaccuracy in no way disturbs the thread lead reading at 11 and 12, as the member 8 will, in its gaging position, be moved to abut against the end 6 of member 4. Since the threads 7 and 1 are of the same pitch, the screwing of the cap 8 further or less onto the threads 7 causes the same rotation of the cap on the shank 4 as though the member 1 were being screwed within the work piece. It should be understood that in the gauge reading position, the cap 8 is always in contact with the shoulder 6.

Likewise any inaccuracy of the lead, the taper being correct, causes a greater or less rotation of the member 1 to place the same in the relative axial position illustrated in Fig. 1. The cap 8 must be rotatably adjusted on the sleeve and shank 4, in engaging the same with the shoulder 6, to allow for this difference. Such adjustment of the cap leaves the zero of graduations 11 to one side or the other of the graduation mark 12 whereby to indicate the inaccuracy of lead. It will therefore be understood that any inaccuracy of taper or thread lead or both is readily indicated by the gauge independently of each other.

The gaging member 1 is also preferably cut away at 14 to provide a shoulder for indicating the diameter accuracy of the opening being gaged. It will be understood that if in the measuring operation the member 1 enters the opening sufficiently to bring the face 14 of the gauge flush with the face of the member being gaged, the diameter of the opening is correct and accurate.

In Figs. 4 and 5, I have shown a modified form of the invention adapted to be applied to the gaging of external tapered threads such as are commonly used on the ends of pipes or other bodies. This modification comprises gaging members or rings 15 and 16 internally threaded at 17 and 18 respectively. Intermediate the rings is a member 19 threaded to the ring 16 at 20, the threads 20 being of the same pitch as the threads 18. The periphery of the member 19 is graduated at 21 to cooperate with a graduation mark 22 on the ring 15 and is graduated at 23 to cooperate with a graduation mark 24 on the ring 16.

The rings 16 and 19 are threaded at 20 and the ring 19 is threadedly engaged with the ring 16 as illustrated. The internal surfaces or bores 17 and 18 of the gaging members 15 and 16 are formed and threaded by securing the two gaging members together in the proper relative position and finishing the screw threads to a master gauge as if the gaging members were one solid member, as above defined in connection with the gauge shown in Fig. 1. With the surfaces 17 and 18 finished and while the members are held secured in the same relative position, the ring 19 is rotated on the member 16 until the forward face thereof contacts firmly with the member 15. With the several parts of the gauge in this correct relationship, the graduations 21 and 23 and the cooperating indicia marks 22 and 24 are formed, the mark 22 being made to exactly register with the zero on the graduations 21 and the mark 24 being made to exactly register with the zero on the graduations 23. The indicia 21, 22 are adapted to indicate the lead accuracy of the screw threads and the indicia 23, 24 are adapted to indicate the taper accuracy.

The operation of the gauge shown in Figs. 4 and 5 is substantially the same as that of the gauge shown in Figs. 1, 2 and 3 heretofore described. A full repetition of such operation is therefore believed unnecessary. The external threaded surface to be tested is first threaded to the gauge as heretofore described and as shown in Fig. 4. The ring 19 is rotated to seat the same firmly against the member 15. If the lead is correct, the mark 22 will be in exact register with the zero of the graduations 21. Likewise if the taper is correct the mark 24 will be in exact register with the zero of the graduations 23. In Figs. 4 and 5, the gauge is shown in contact with a master plug gauge 25. The taper and lead of the thread gaging portion of this master gauge is correct and therefore the said indicia register exactly with the said zeros, as illustrated.

What I claim is:

1. A gauge for testing the taper and lead of threaded conical surfaces comprising in combination, a threaded gaging member adapted to contact with a portion of the threaded conical surface to be gaged, a second threaded gaging member adapted to contact with another portion of said threaded surface, means co-operating with the said members to indicate the conical or taper accuracy of the surface, and means movably mounted on one of the members and cooperating with the other member for indicating the accuracy of the lead of the thread being gaged.

2. A gauge for testing the taper and lead of threaded conical surfaces comprising in combination, a threaded gaging member adapted to contact with a portion of the threaded conical surface to be gaged, a second threaded gaging member adapted to contact with another portion of said threaded surface, means cooperating with the said members to indicate the conical or taper accuracy of the surface, and means threaded to one of the members and contacting with the other member for indicating the accuracy of the lead of the thread being gaged.

3. A gauge for testing the taper and lead of threaded conical surfaces comprising in combination, a threaded gaging member adapted to contact with a portion of the threaded conical surface to be gaged, a second threaded gaging member adapted to contact with another portion of the said threaded surface, means functioning by the axial relative spacing of the said two members for indicating the conical or taper accuracy of the surface, and means threaded to one of the members and cooperating with the other member for indicating the accuracy of the lead of the thread being gaged, the said lead being measured by the rotary position of the last named means.

4. A gauge for testing the taper and lead of threaded conical surfaces comprising in combination, a threaded gaging member adapted to contact with a portion of the threaded conical surface to be gaged, a second threaded gaging member adapted to contact with another portion of the said threaded surface, means functioning by the axial relative spacing of the said two members for indicating the conical or taper accuracy of the surface, one of the members being provided with other screw threads thereon of a pitch corresponding exactly to the pitch of the threads on the gaging portion thereof, and means threaded to the said other screw threads and cooperating with the other member for indicating the accuracy of the lead of the thread being gaged, the said lead being measured by the rotary position of the last named means.

5. A gauge for testing the taper and lead of threaded conical surfaces comprising in combination, a gaging member having a threaded portion adapted to contact with a portion of the threaded conical surface to be gaged and having a sleeve extending axially therefrom, a second gaging member having a threaded portion adapted to contact with another portion of the surface to be gaged and having a shank extending axially therefrom within the sleeve, and means on the said shank and sleeve to indicate the conical or taper accuracy of the surface and the accuracy of the lead of the thread therein.

6. A gauge for testing the lead of screw threads comprising in combination, a threaded gaging member adapted to contact with a portion of the threaded surface to be gaged, a second gaging member adapted to contact with another portion of the said threaded surface spaced axially from the first portion, means to determine the distance apart of said threaded portions, and means cooperating with the said members for indicating their relative angular positions to determine the accuracy of lead of the threads being gaged.

7. A gauge for testing the lead of screw threads comprising in combination, a threaded gaging member adapted to contact with a portion of the threaded surface to be gaged, a second threaded gaging member adapted to contact with another portion of the said threaded surface spaced axially from the first portion, means to determine the distance apart of said threaded portion, the said members being coaxial, and means cooperating with the said members for indicating their relative angular positions to determine the accuracy of lead of the threads being gaged.

8. A gauge for testing the lead of screw threads comprising in combination, a threaded gaging member adapted to contact with a portion of the threaded surface to be gaged, a second threaded gaging member adapted to contact with another portion of the said threaded surface, one of the members being provided with other screw threads thereon of a pitch corresponding exactly to the pitch of the threads on the gaging portion thereof, and means threaded to the said other screw threads and co-operating with the other member for indicating the accuracy of lead of the threads being gaged, the said lead being measured by the rotary position of the last named means.

9. A gauge for testing the lead of screw threads comprising in combination, a threaded gaging member adapted to contact with a portion of the threaded surface to be gaged and having a sleeve extending axially therefrom, a second threaded gaging member adapted to contact with another portion of the said threaded surface and having a shank extending axially therefrom within the sleeve, and means cooperating with the said shank and sleeve for indicating the accuracy of lead of the threads being gaged.

10. A gauge for testing the lead of screw threads comprising in combination, a threaded gaging member adapted to contact with a portion of the threaded surface to be gaged and having a sleeve extending axially therefrom, a second threaded gaging member adapted to contact with another portion of the said threaded surface and having a shank extending axially therefrom within the sleeve, and means threaded to the sleeve and co-operating with the shank for indicating the accuracy of the lead of the thread being gaged, the said lead being measured by the rotary position of the last named means relative to the sleeve.

In testimony whereof, I hereto affix my signature.

EARLE BUCKINGHAM.